US012693949B2

(12) United States Patent
Togo et al.

(10) Patent No.: US 12,693,949 B2
(45) Date of Patent: Jul. 28, 2026

(54) COMPUTER SYSTEM AND STORAGE MANAGING METHOD

(71) Applicant: Hitachi Vantara, Ltd., Kanagawa-ken (JP)

(72) Inventors: Kazuki Togo, Tokyo (JP); Akira Deguchi, Tokyo (JP); Akiyoshi Tsuchiya, Tokyo (JP); Kenta Sato, Tokyo (JP)

(73) Assignee: Hitachi Vantara, Ltd., Kanagawa-ken (JP)

( * ) Notice: Subject to any disclaimer, the term of this patent is extended or adjusted under 35 U.S.C. 154(b) by 34 days.

(21) Appl. No.: 18/882,275

(22) Filed: Sep. 11, 2024

(65) Prior Publication Data

US 2025/0199924 A1     Jun. 19, 2025

(30)       Foreign Application Priority Data

Dec. 13, 2023    (JP) ................................. 2023-210206

(51) Int. Cl.
G06F 11/20          (2006.01)
(52) U.S. Cl.
CPC ...... G06F 11/2046 (2013.01); G06F 11/2023 (2013.01); *G06F 2201/805* (2013.01)
(58) Field of Classification Search
CPC .. G06F 11/20; G06F 11/2023; G06F 11/2025; G06F 11/2046; G06F 11/2056; G06F 11/2094
See application file for complete search history.

(56)         References Cited

U.S. PATENT DOCUMENTS

| | | | |
|---|---|---|---|
| 2018/0018244 A1* | 1/2018 | Yoshimura ............ | G06F 9/5077 |
| 2018/0032254 A1 | 2/2018 | Okada et al. | |
| 2018/0365117 A1* | 12/2018 | Basham .............. | G06F 11/2094 |
| 2020/0042411 A1* | 2/2020 | Krishnan ............ | G06F 11/2048 |
| 2020/0097556 A1* | 3/2020 | Chen ................... | G06F 11/2094 |
| 2024/0103987 A1* | 3/2024 | Nara ................... | G06F 11/2097 |

FOREIGN PATENT DOCUMENTS

WO      2016/194096 A1   12/2016

* cited by examiner

*Primary Examiner* — Michael Maskulinski
(74) *Attorney, Agent, or Firm* — Procopio, Cory, Hargreaves & Savitch LLP

(57)          ABSTRACT

Violation of a recovery requirement is prevented at the time of a failover to a secondary site in case of failure while suppressing cost on hardware of the secondary site in normal times. In a computer system including: a primary site storage system; a secondary site storage system; and a management device, the management device can change a resource of the secondary site storage system, and in the case where a failure occurs in the primary site, the management device performs a failover of making a corresponding secondary volume take over operation of the primary volume, controls so as to enhance a resource of the secondary site storage system, and controls the failover so that a secondary volume which starts operating by the failover before the enhancement of the resource and a secondary volume which starts operating by the failover after the enhancement of the resource exist.

7 Claims, 14 Drawing Sheets

RECOVERY REQUIREMENT MANAGEMENT TABLE

| ID | REMOTE COPY PAIR ID | PRIMARY SITE VOL ID | SECONDARY SITE VOL ID | RECOVERY REQUIREMENT |
|----|----|----|----|----|
| 3311 | 3312 | 3313 | 3314 | 3315 |
| 1 | 1 | 1 | 2 | IMMEDIATE RECOVERY |
| 2 | 2 | 2 | 4 | NOT-IMMEDIATE RECOVERY |
| 3 | 3 | 3 | 6 | RTO = 30 MINUTES |
| 4 | 4 | 4 | 8 | RTO = 1 HOUR |
| 5 | 5 | 5 | 10 | RTO = 2 HOURS |
| 6 | 6 | 6 | 12 | RTO = 10 HOURS |
| ... | ... | ... | ... | ... |

INSTANCE SPECIFICATION MANAGEMENT TABLE

| INSTANCE SPEFICIATION ID | COST | CPU SPECIFICATIONS | MEMORY CAPACITY | NETWORK BANDWIDTH |
|---|---|---|---|---|
| 1 | 1$/h | 3.1GHz, 16 CORES | 128GiB | 10Gbps |
| 2 | 2$/h | 3.1GHz, 32 CORES | 256GiB | 20Gbps |
| 3 | 4$/h | 3.1GHz, 64 CORES | 256GiB | 50Gbps |
| ... | | ... | ... | ... |

Figure 7:
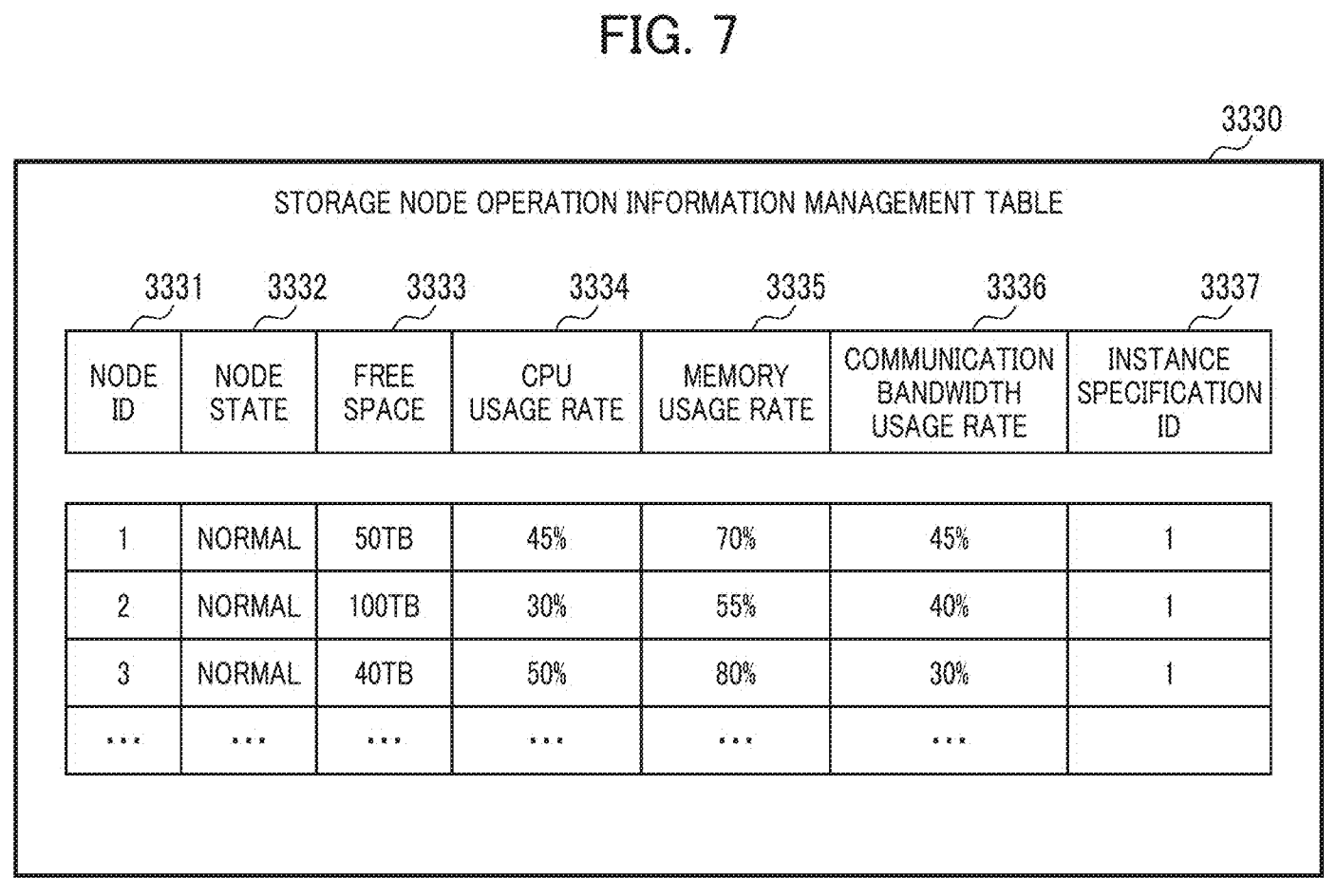

STORAGE NODE OPERATION INFORMATION MANAGEMENT TABLE

3330

| NODE ID | NODE STATE | FREE SPACE | CPU USAGE RATE | MEMORY USAGE RATE | COMMUNICATION BANDWIDTH USAGE RATE | INSTANCE SPECIFICATION ID |
|---|---|---|---|---|---|---|
| | 3332 | 3333 | 3334 | 3335 | 3336 | 3337 |
| 3331 | | | | | | |
| 1 | NORMAL | 50TB | 45% | 70% | 45% | 1 |
| 2 | NORMAL | 100TB | 30% | 55% | 40% | 1 |
| 3 | NORMAL | 40TB | 50% | 80% | 30% | 1 |
| ... | ... | ... | ... | ... | ... | ... |

FIG. 8

REMOTE COPY PAIR MANAGEMENT TABLE　3340

| REMOTE COPY PAIR ID | PRIMARY SITE VOL ID | SECONDARY SITE VOL ID | SECONDARY SITE VOL PLACEMENT DESTINATION NODE ID | RESTORE STATE |
|---|---|---|---|---|
| 3341 | 3342 | 3343 | 3344 | 3345 |
| 1 | 1 | 2 | 1 | FAILOVER COMPLETED |
| 2 | 2 | 4 | 2 | FAILOVER COMPLETED |
| 3 | 3 | 6 | 3 | DURING FAILOVER |
| 4 | 4 | 8 | 1 | SECONDARY SITE VOL BEING TRANSFERRED TO ANOTHER NODE |
| 5 | 5 | 10 | 2 | SECONDARY SITE VOL BEING TRANSFERRED TO ANOTHER NODE |
| 6 | 6 | 12 | 3 | PROCESS UNEXECUTED |
| ... | ... | ... | ... | ... |

COMPUTER SYSTEM AND STORAGE MANAGING METHOD

CROSS REFERENCE TO RELATED APPLICATIONS

This application claims priority to Japanese Patent Application No. 2023-210206, filed Dec. 13, 2023, the contents of which are incorporated herein by reference in its entirety for all purposes.

BACKGROUND

This invention relates to a computer system and a storage managing method.

As a technique of copying a storage system among a plurality of data centers which are geographically apart to continue business even when a disaster occurs, there is a remote copying function. In a storage system which is configured by a plurality of nodes and provided with the remote copying function, a site processing a business application in normal times is called a primary site, and a site which is switched from the primary site and operated when a failure occurs in the whole primary site and the storage system stops is called a secondary site.

For example, PCT International Publication No. WO2016/194096A1 discloses a technique, when a primary site and a secondary site are paired as a remote copy pair in a configuration that the secondary site is assembled by a plurality of storage devices, of making the pair by selecting storage devices on the secondary site side so as to satisfy the performance and capacity requirements of the primary site. PCT International Publication No. WO2016/194096A1 provides a configuration realizing reduction in the load on the storage devices of the site for recovery in an environment where the performance and the capacity of storage devices in the primary site and those of the site for recovery for performing remote copying are different. On the basis of the performance information and free space capacity information of the storages in the site for recovery, a second volume which forms a first volume and a remote copy is placed in the storage device in the site for recovery capable of satisfying a performance requirement in the event of a failure of the first volume provided to the host in the primary site. PCT International Publication No. WO2016/194096A1 also describes a method of managing a computer system by making a volume group of each of first volumes which makes a remote copy with a second volume placed in a storage device of a site for recovery and the second volume, further, setting an extended volume group including a plurality of second volumes in which a plurality of pieces of data are recorded in accordance with the order of writing to the first volume, and the first volume.

SUMMARY

In PCT International Publication No. WO2016/194096A1, to suppress decrease in the process performance of a host I/O after switching (failover) from the primary site to the secondary site, in the secondary site, sufficient hardware which can withstand remote copying process and host I/O process after a failover is prepared. However, in normal times, the secondary site performs only the remote copying process. Consequently, the hardware is excessive in normal times, and the introduction cost of the secondary site is high. Further, in the case of using pay-per-use hardware which is provided by a cloud vendor as a secondary site, the operation cost increases only by the amount of the hardware which is excessive in normal times.

It is considered to use hardware which withstands only the remote copying process as the hardware configuration of a secondary site in normal times and, using a state switching of a system by a failover and a failback as a trigger, to dynamically change the hardware of the secondary site. In this case, however, the dynamic change of the hardware accompanies change time. There is consequently the possibility that a recovery requirement such as RTO (Recovery Time Objective) is violated.

An object of the present invention is to prevent violation of a recovery requirement such as RTO at the time of a failover to a secondary site in the event of occurrence of a failure while suppressing cost on hardware of the secondary site in normal times.

In order to achieve the above object, a typical computer system of the present invention includes: a primary site storage system in which a primary site providing a plurality of primary volumes to a host is configured; a secondary site storage system which is connected to the primary site storage system via a network and in which a secondary site providing a plurality of secondary volumes in which remote copies of the plurality of primary volumes are set is configured; and a management device managing the primary site storage system and the secondary site storage system. The management device can change a resource of the secondary site storage system, and in the case where a failure occurs in the primary site, the management device performs a failover of making a corresponding secondary volume take over operation of the primary volume, controls so as to enhance a resource of the secondary site storage system, and controls the failover so that a secondary volume which starts operating by the failover before the enhancement of the resource and a secondary volume which starts operating by the failover after the enhancement of the resource exist.

Further, a typical one of a storage managing method of the present invention is as follows. The storage managing method performed by a computer system includes: a primary site storage system in which a primary site providing a plurality of primary volumes to a host is configured; a secondary site storage system which is connected to the primary site storage system via a network and in which a secondary site providing a plurality of secondary volumes in which remote copies of the plurality of primary volumes are set is configured; and a management device managing the primary site storage system and the secondary site storage system. The management device can change a resource of the secondary site storage system, and in the case where a failure occurs in the primary site, the management device performs a failover to make a corresponding secondary volume take over operation of the primary volume, controls so as to enhance a resource of the secondary site storage system, and controls the failover so that a secondary volume which starts operating by the failover before the enhancement of the resource and a secondary volume which starts operating by the failover after the enhancement of the resource exist.

According to the present invention, it is possible to prevent violation of a recovery requirement at the time of a failover to a secondary site in the event of occurrence of a failure while suppressing cost on hardware of the secondary site in normal times.

BRIEF DESCRIPTION OF THE DRAWINGS

FIG. 5 is a configuration diagram of a recovery requirement management table according to an embodiment, FIG. 6 is a configuration diagram of an instance specification management table according to an embodiment, FIG. 7 is a configuration diagram of a storage node operation information management table according to an embodiment, FIG. 8 is a configuration diagram of a remote copy pair management table according to an embodiment.

DETAILED DESCRIPTION

One embodiment of the invention will now be described with reference to the drawings. An embodiment which will be described hereinafter does not limit the invention in the scope of claims for a patent. All of elements and their combinations described in the embodiment are not always necessary for solving means of the invention.

In the following, information will be described by an expression of "AAA table". However, information may be expressed in any data structure. That is, to indicate that information does not depend on a data structure, an "AAA table" can be called "AAA information".

In the following description, there is the case of describing the process serving a program as the entity of the operation. Since a program performs a predetermined process by a processor (for example, CPU) while properly using storage of resources (for example, memory) and/or a communication interface device (for example, NIC (Network Interface Card)), the entity of the process may be a processor. The process described using the program as the entity of the operation may be set as a process performed by a processor or a computer (system) having the processor.

In the following description, two or more programs may be realized by one program. One program may be realized by two or more programs.

In the following description, "VOL" indicates a logical volume and a logical storage device. VOL may be a tangible volume (volume based on a physical storage device) or a virtual volume.

In the following description, an "instance" refers to a virtual computer configured by software using recourses on one or more physical computers.

In the following description, "instance specification" is determined by a combination of specification values of resources such as CPU frequency, the number of cores, memory speed, memory capacity, and network interface (I/F) bandwidth, and indicates the kind of the configuration of an instance. The values of specifications may be CPU frequency, the number of cores, memory speed, memory capacity, and network I/F bandwidth, and other values.

In the following description, "remote copying" is the function of copying I/O data for a volume from the host to a volume in one of sides to assure redundancy by a remote copy pair made by a primary volume (PVOL) as a volume on the primary site 10 and a secondary volume (SVOL) on the secondary site 20. The process of copying a volume on one of sites may be synchronous with I/O process on a volume from the host or may be asynchronous with the I/O process.

First Embodiment

Figure 1:
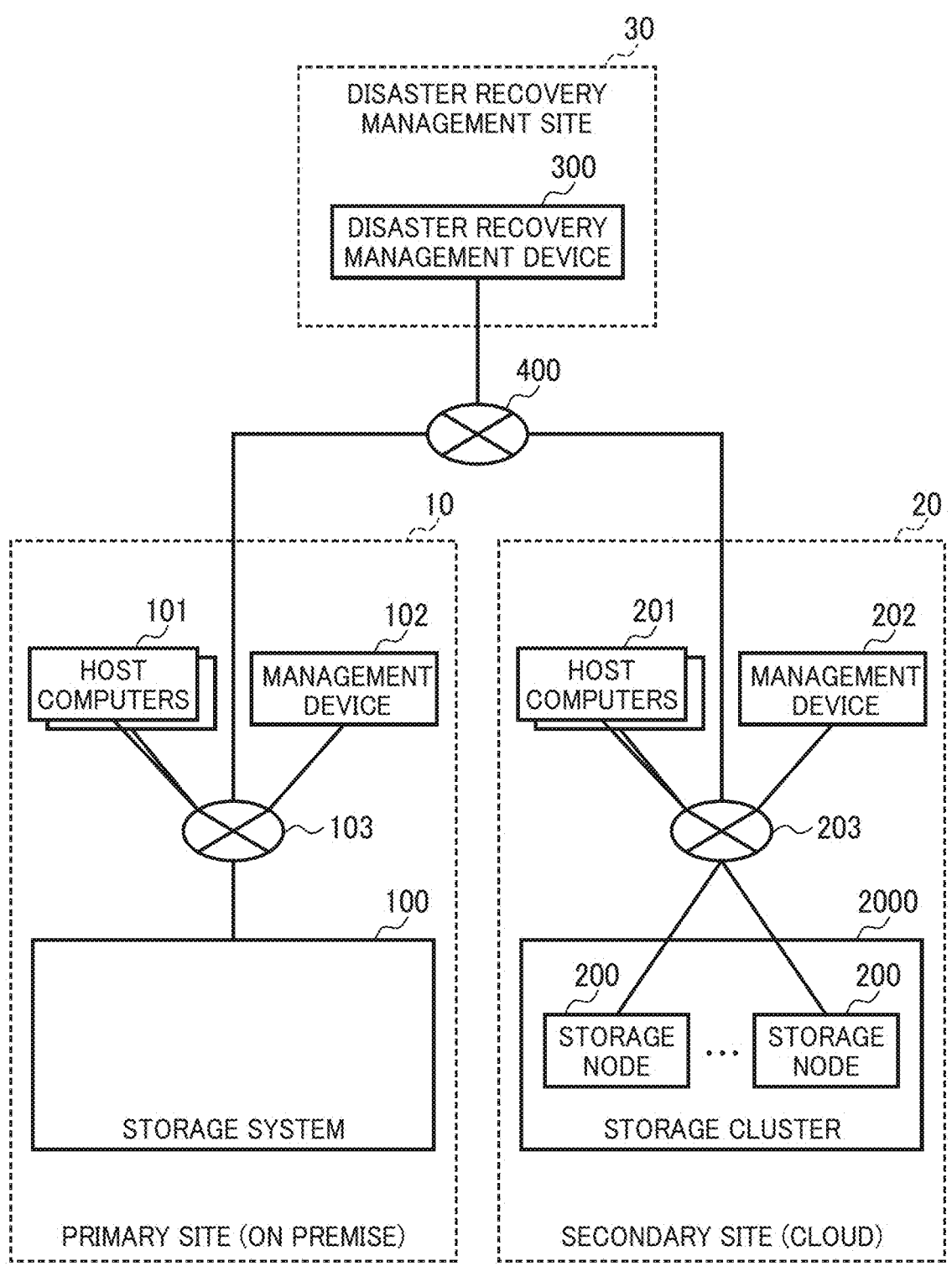
FIG. 1 is an overall configuration diagram of a storage management system according to an embodiment.

FIG. 1 is an overall configuration diagram of a storage management system according to an embodiment.

In a storage management system 1 corresponding to a computer system in an aspect of the present invention, three sites of a primary site 10 placed on a premise, a secondary site 20 placed in the cloud, and a disaster recovery management site 30 are connected to one another via an external network 400.

The primary site 10 has at least one storage system 100, at least one host computer 101, and a management device 102.

The storage system 100, the host computer 101, and the management device 102 are connected to one another via an internal network 103. The internal network 103 is, for example, a LAN (Local Area Network), a WAN (Wide Area Network), or the like.

The storage system 100 is a device providing a storage area for reading/writing data from/to the host computer 101. The storage area may be also expressed as a volume or an LUN. The storage system 100 may be a physical computer or a virtual computer.

The management device 102 is a computer used by a system administrator to manage the entire primary site 10. The management device 102 may be a physical computer or a virtual computer. The management device 102 obtains information from the storage system 100 and the host computer 101 and displays the information via a user interface (GUI (Graphical User Interface) or CLI (Command Line Interface)) by a program. The management device 102 has a function of transmitting an instruction entered by the system administrator via the user interface to the storage system 100 and the host computer 101. The management device 102 may have a function of automatically transmitting an optimum instruction to the storage system 100 and the host computer 101 on the basis of information obtained from the storage system 100 and the host computer 101 without an instruction given by the system administrator. The function of the management device 102 may be realized by any of the storage systems 100.

The host computer 101 is a computer transmitting a read/write request (hereinafter, it will be appropriately called an I/O (Input/Output) request) to the storage system 100 in accordance with a user operation or a request from an application program (for example, a file server program or a database server program). The host compute 101 may be a physical computer or a virtual computer.

The secondary site 20 has a storage cluster 2000, at least one host computer 201, and a management device 202. The storage cluster 2000 has one or more storage nodes 200. The storage cluster 2000 may be also called a storage system or a dispersed storage system.

The storage node 200, the host computer 201, and the management device 202 are connected via an internal network 203. The internal network 203 may be, for example, a LAN (Local Area Network), a WAN (Wide Area Network), or the like.

The storage node 200 is a device providing a storage area for reading/writing data from/to the host computer 201. The storage area may be also expressed as a volume or an LUN. The storage node 200 may be a physical computer or a virtual computer.

The management device 202 is a computer used by the system administrator to manage the secondary site 20. The management device 202 may be a physical computer or a virtual computer. The management device 202 obtains information from the entire storage cluster 2000, the storage node 200, and the host computer 201 and displays the information via a user interface (GUI (Graphical User Interface) or CLI (Command Line Interface)) by a program. The management device 202 has a function of transmitting an instruction entered by the system administrator to the entire storage cluster 2000, the storage node 200, and the host computer 201 via the user interface. The management device 202 may have a function of automatically transmitting an optimum instruction to the storage cluster 2000, the storage node 200, and the host computer 201 on the basis of information obtained from the storage cluster 2000, the storage node 200, and the host computer 201 without an instruction given by the system administrator. The function of the management device 202 may be realized by any of the storage nodes 200.

The host computer 201 is a computer transmitting a read/write request (hereinafter, appropriately called an I/O (Input/Output) request) to the storage cluster 2000 in response to a user operation or a request from an application program (for example, a file server program or a database server program). The host computer 201 may be a physical computer or a virtual computer. For example, in the case where the cluster is configured by a plurality of storage nodes 200, a multipath is set between the host computer 201 and the storage nodes constructing the cluster. For the setting of the multipath, arbitrary service can be used.

The disaster recovery management site 30 has a disaster recovery management device 300. The disaster recovery management device 300 is connected to the primary site 10 and the secondary site 20 via the external network 400, and can perform operation management handling to each of the devices in the primary site 10 and each of the devices in the secondary site 20. The disaster recovery management device 300 may be a physical computer or a virtual computer.

The storage node 200 will now be described in detail.

Figure 2:
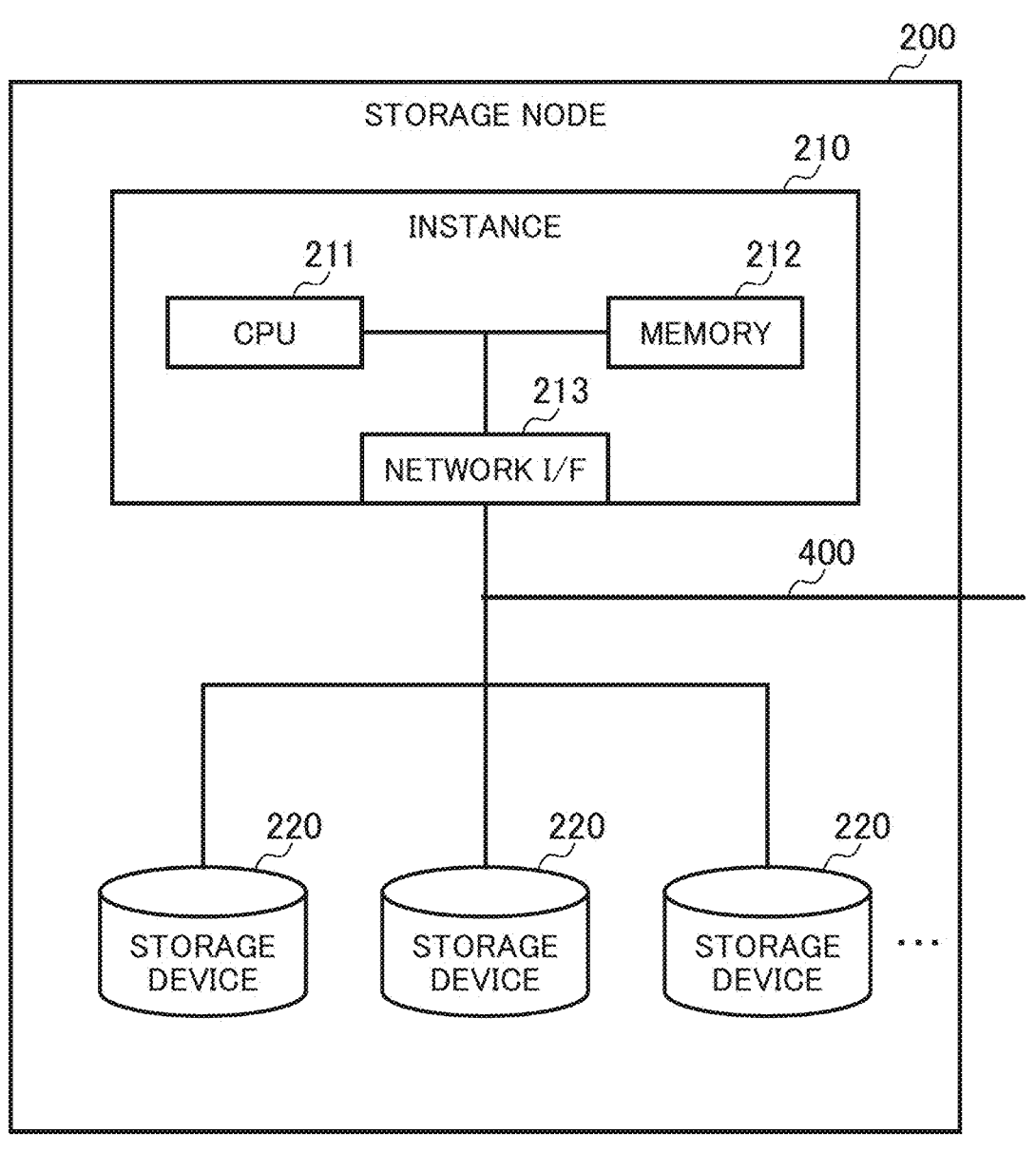
FIG. 2 is a configuration diagram of a storage node according to an embodiment.

FIG. 2 is a configuration diagram of a storage node according to an embodiment.

The storage node 200 includes at least one instance 210 and at least one storage device 220.

The instance 210 is a virtual computer configured by software by using resources of a physical computer in the cloud. The instance 210 may be a virtual machine.

The instance 210 includes a CPU 211, a memory 212, and a network I/F 213. The resource amount of the CPU 211, the memory 212, and the network I/F 213 in the instance 210 is a resource amount corresponding to a predetermined instance specification. The CPU 211 is a virtual CPU which is obtained by virtually allocating a physical CPU of a physical computer in the cloud. The CPU 211 performs a process such as control on an access to the storage device 220 on the basis of a program or management information stored in the memory 212. The memory 212 is a virtual memory obtained by virtually allocating a physical memory of the physical computer in the cloud. The memory 212 stores the program which is executed by the CPU 211 and the management information which is referred to or updated by the CPU 211. The network I/F 213 is an I/F for performing communication with the storage devices 220, other storage nodes 200, the management device 202, the host computer 201, and the disaster recovery management device 300 via the network 400.

The storage device 220 is a physical or virtual storage device and may be typically a nonvolatile storage device. The storage device 220 may be, for example, an HDD (Hard Disk Drive) or SSD (Solid State Drive). The storage device 220 stores user data used by the host computer 201.

Subsequently, the disaster recovery management device 300 will be described in detail.

Figure 3:
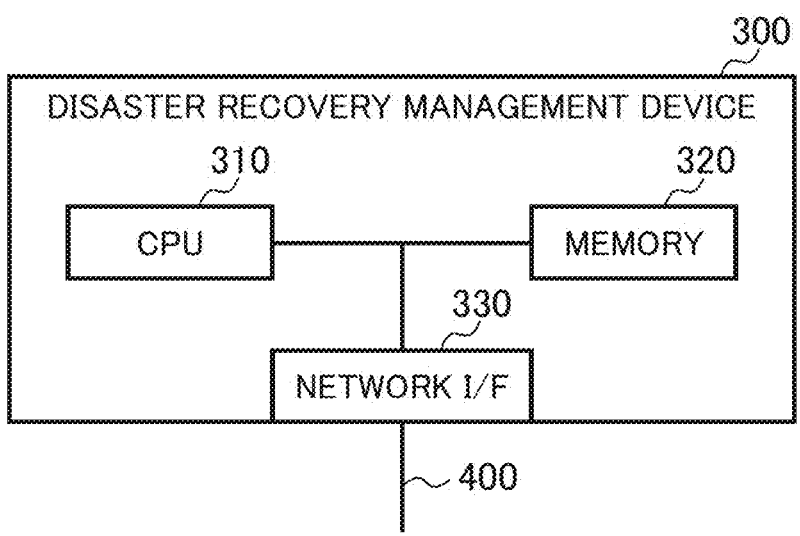
FIG. 3 is a configuration diagram of a disaster recovery management device according to an embodiment.

FIG. 3 is a configuration diagram of the disaster recovery management device according to an embodiment.

The disaster recovery management device 300 includes a CPU 310, a memory 320, and a network I/F 330. The CPU 310 performs a process of controlling the storage system 100 and the host computer 101 in the primary site 10 and the storage cluster 2000 and the host computer 201 in the secondary site 20 on the basis of a program and management information stored in the memory 320. The memory 320 stores a program which is executed by the CPU 310 and management information which is referred to or updated by the CPU 310. The network I/F 330 is an I/F for performing communication with the storage system 100 and the host computer 101 in the primary site 10 and the storage cluster 2000 and the host computer 201 in the secondary site 20 via the network 400.

The configuration of the memory 320 in the disaster recovery management device 300 will now be described.

Figure 4:
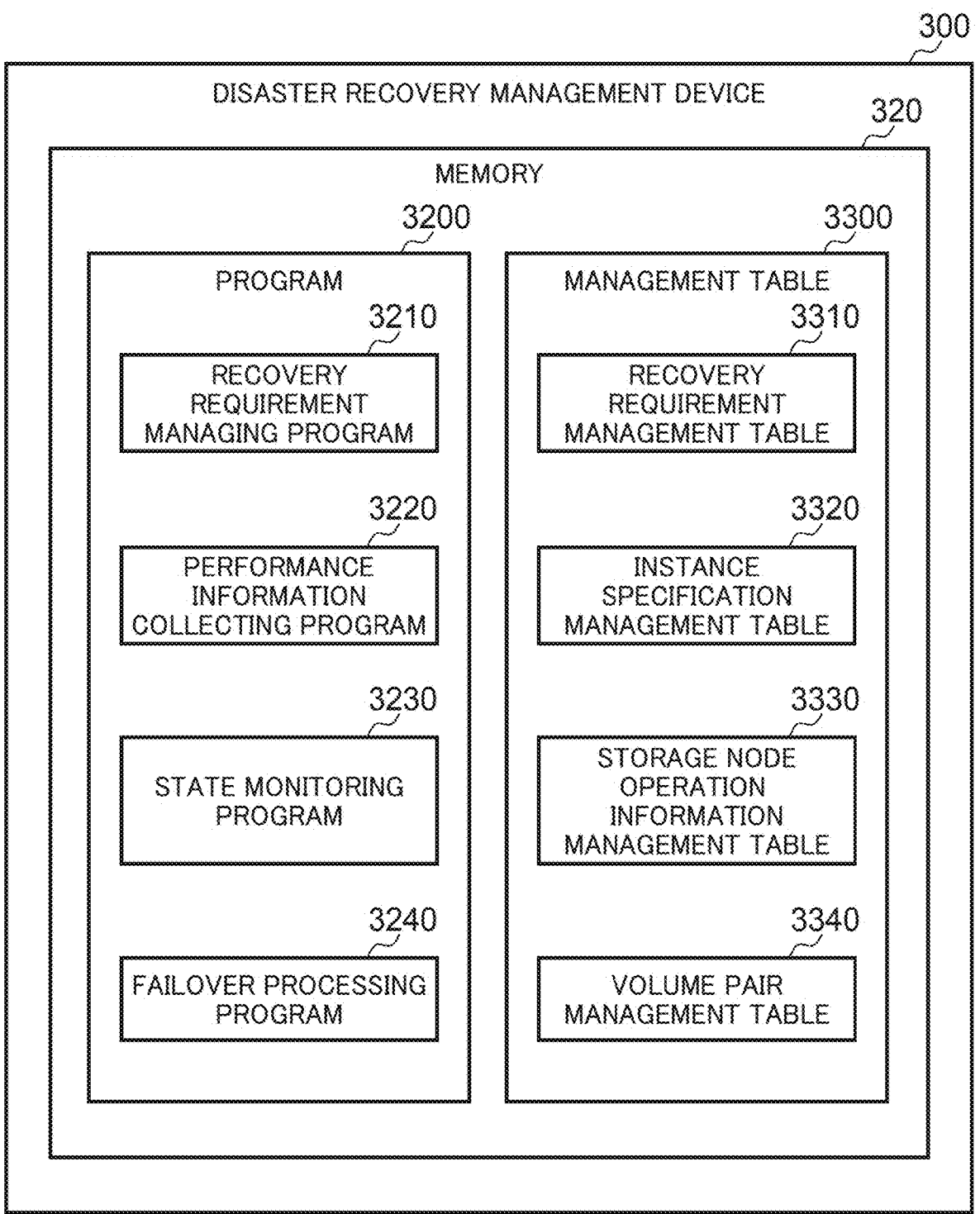
FIG. 4 is a configuration diagram of a memory in the disaster recovery management device according to an embodiment.

FIG. 4 is a configuration diagram of a memory of a disaster recovery management device according to an embodiment.

The memory 320 in the disaster recovery management device 300 stores a program 3200 and a management table 3300.

The program 3200 includes a recovery requirement managing program 3210, a performance information collecting program 3220, a state monitoring program 3230, and a failover processing program 3240.

The management table 3300 includes a recovery requirement management table 3310, an instance specification management table 3320, a storage node operation information management table 3330, and a remote copy pair management table 3340.

The recovery requirement managing program 3210 collects recovery requirement information of each volume on the storage system 100 and the storage cluster 2000 on the basis of an input by the administrator of the disaster recovery management device 300 and information of an application program of the user provided by the host computer and the storage system, and records data in the recovery requirement management table 3310. The recovery requirement information is information indicating until when recovery is done in the case where a failure occurs in the storage system 100 of the primary site 10 and a failover is carried out to the storage cluster 2000 of the secondary site 20. The recovery requirement information may be information of clear time designation such as RTO or information which does not indicate clear time such as immediate recovery or not.

The performance information collecting program 3220 collects performance information from the storage node 200 and records the data in the storage node operation information management table 3330.

The state monitoring program 3230 obtains the state of the primary site from the primary site 100 and detects whether the primary site 10 is in a failed state or not. In the case where the primary site 10 is in a failed state, a failover instruction to the secondary site 20 is transmitted.

The failover processing program 3240 starts processing using, as a trigger, switching to the secondary site due to occurrence of a failure in the primary site, determines the timing of enhancement of resources such as scale-out or scale-up of the storage cluster 2000 and the timing of a failover of each volume so as to satisfy a recovery requirement of each volume on the basis of the information of the recovery requirement management table 3310, the storage node operation information management table 3330, and the remote copy pair management table 3340, and transmits an instruction of resource enhancement and failover to the storage cluster 2000.

Subsequently, the recovery requirement management table 3310 will be described.

FIG. 5 is a configuration diagram of a recovery requirement management table according to an embodiment.

The recovery requirement management table 3310 is a table for managing a requirement of until when recovery is done in the case where a failure occurs in the storage system 100 in the primary site 10 of the storage management system 1 and a failover is performed to the storage cluster 2000 in the secondary site 20. The recovery requirement management table 3310 stores an entry by each remote copy pair made by the volume of the storage system 100 and the volume of the storage cluster 2000. An entry in the recovery requirement management table 3310 includes fields of an ID 3311, a remote copy pair ID 3312, a primary site VOL ID 3313, a secondary site VOL ID 3314, and a recovery requirement 3315.

In the ID 3313, an identification number of each entry in the recovery requirement management table 3310 is stored. In the remote copy pair ID 3312, the identification number of a remote copy pair is stored, and is associated with a remote copy pair ID 3341 in the remote copy pair management table 3340. In the primary site VOL ID 3313, the identification number of the volume of the storage system 100 in the primary site 10 as an element of the remote copy pair is stored. In the secondary site VOL ID 3314, the identification number of the volume of the storage cluster 2000 of the secondary site 20 as an element of the remote copy pair is stored. In the recovery requirement 3315, recovery requirement information is stored. The recovery requirement information may be information of clear time designation such as RTO or information which does not indicate clear time such as immediate recovery or not.

Next, the instance specification management table 3320 will be described.

FIG. 6 is a configuration diagram of an instance specification management table according to an embodiment.

The instance specification management table 3320 is a table for managing an instance specification which can be used by the instance 210, and stores an entry of each instance specification. An entry of the instance specification management table 3320 includes fields of an instance specification ID 3321, a cost 3322, a CPU specification 3323, a memory capacity 3324, and a network bandwidth 3325.

In the instance specification ID 3321, the identification number (instance specification ID) uniquely identifying an instance specification corresponding to the entry is stored. In the cost 3322, fee for using the instance specification, for example, price per hour is stored. In the CPU specification 3323, the frequency and the number of cores of a CPU assigned by the instance specification corresponding to the entry are stored. In the memory capacity 3324, the capacity of the memory (memory capacity) assigned by the instance specification corresponding to the entry is stored. In the network bandwidth 3325, the bandwidth (network bandwidth) of the network I/F assigned to the instance specification corresponding to the entry is stored. As an instance specification of the instance specification management table 3320, a plurality of instance specifications which are different only by the value of any one of the resources (for example, the number of CPU cores) may be included.

Next, the storage node operation information management table 3330 will be described.

FIG. 7 is a configuration diagram of a storage node operation information management table according to an embodiment.

The storage node operation information management table 3330 is a table for managing information of the present state of the storage node 200 of the storage cluster 2000. The storage node operation information management table 3330 stores an entry by each storage node 200. An entry in the storage node operation information management table 3330 includes fields of a node ID 3331, a node state 3332, a free space 3333, a CPU usage rate 3334, a memory usage rate 3335, a communication bandwidth usage rate 3336, and an instance specification ID 3337.

In the node ID 3331, the identification number (node ID) of the storage node 200 corresponding to the entry is stored. In the node state 3332, the state of the storage node 200 corresponding to the entry is stored. The node state 3332 may be, for example, information such as "normal" or "abnormal". In the free space 3333, the total of the free spaces of the storage devices 220 in the storage node 200 corresponding to the entry is stored. In the CPU usage rate 3334, the usage rate of the CPU 211 in the storage node 200 corresponding to the entry is stored. In the memory usage rate 3335, the usage rate of the memory 212 in the storage node 200 corresponding to the entry is stored. In the communication bandwidth usage rate 3336, the usage rate of the communication bandwidth in the communication I/F 240 of the storage node 200 corresponding to the entry is stored. In the instance specification ID 3337, the instance specification ID corresponding to the instance specification of the instance 210 of the storage node 200 corresponding to the entry is stored, and is associated with the instance specification ID 3321 of the instance specification management table 3320.

An entry of the storage node operation information may be provided with performance information of each storage node as time sequential information. In this case, it is sufficient to prepare, for example, information acquisition time or the like as a field.

Next, the remote copy pair management table 3340 will be described.

FIG. 8 is a configuration diagram of a remote copy pair management table according to an embodiment.

The remote copy pair management table 3340 is a table for managing information regarding the state of a remote copy pair, and stores an entry by each remote copy pair. An entry in the remote copy pair management table 3340 includes fields of a remote copy pair ID 3341, a primary site VOL ID 3342, a secondary site VOL ID 3343, a secondary site VOL placement destination node ID 3344, and a recovery state 3345.

In the remote copy pair ID 3341, the identification number of a remote copy pair corresponding to the entry is stored. In the primary site VOL ID 3342, the identification number of a primary site VOL of the remote copy pair corresponding to the entry is stored. In the secondary site VOL ID 3343, the identification number of a secondary site VOL of the remote copy pair corresponding to the entry is stored. In the secondary site VOL placement destination node ID 3344, the identification number of the storage node 200 in which the secondary site VOL of the remote copy pair corresponding to the entry is placed is stored. In the recovery state 3345, the information of the recovery state of the remote copy pair corresponding to the entry is stored. As information of the recovery state, for example, states such as "during failover", "failover completed", "secondary site VOL being transferred to another node", "secondary site VOL destination node being prepared", and "unprocessed" may be used. The state of the recovery process may be also expressed by the other states.

Next, outline after occurrence of a failure in the primary site from the normal state of the storage management system 1 will be described.

Figure 9:
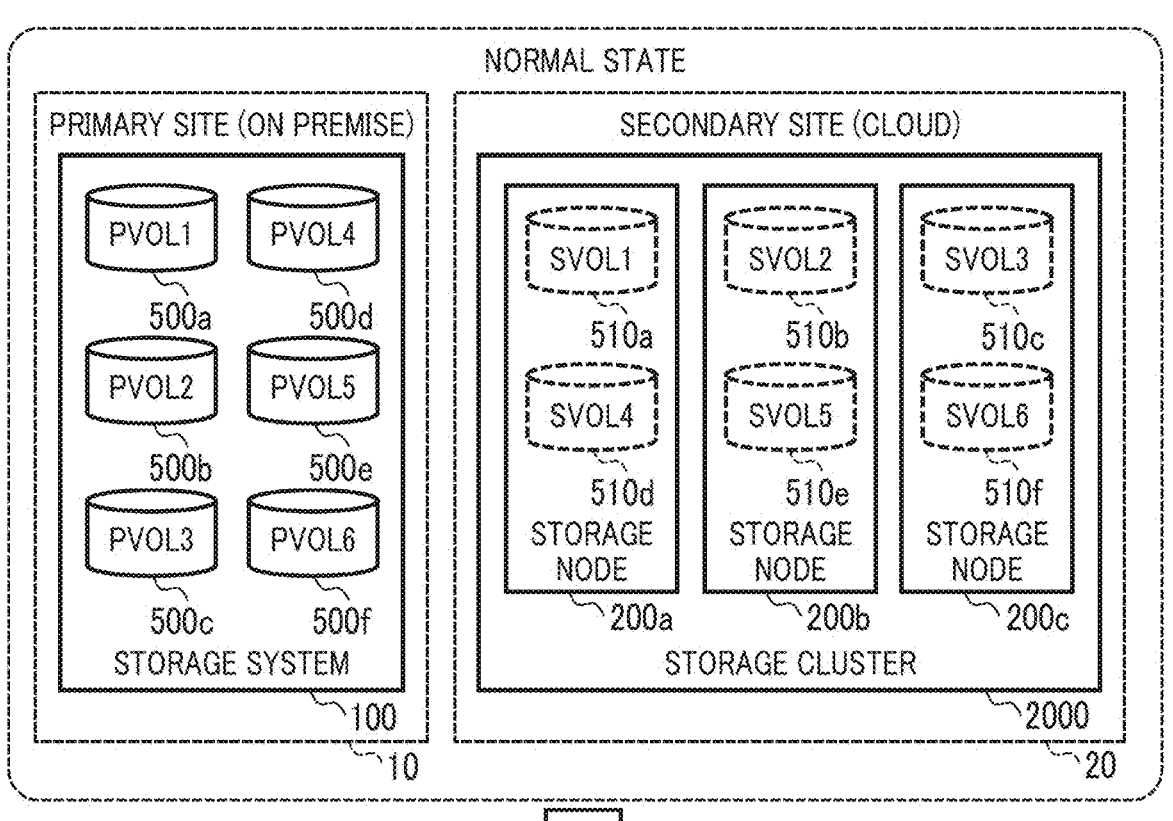
FIG. 9 is a diagram illustrating outline after occurrence of a failure in a primary site from a normal state of a storage management system according to an embodiment.
Figure 9:
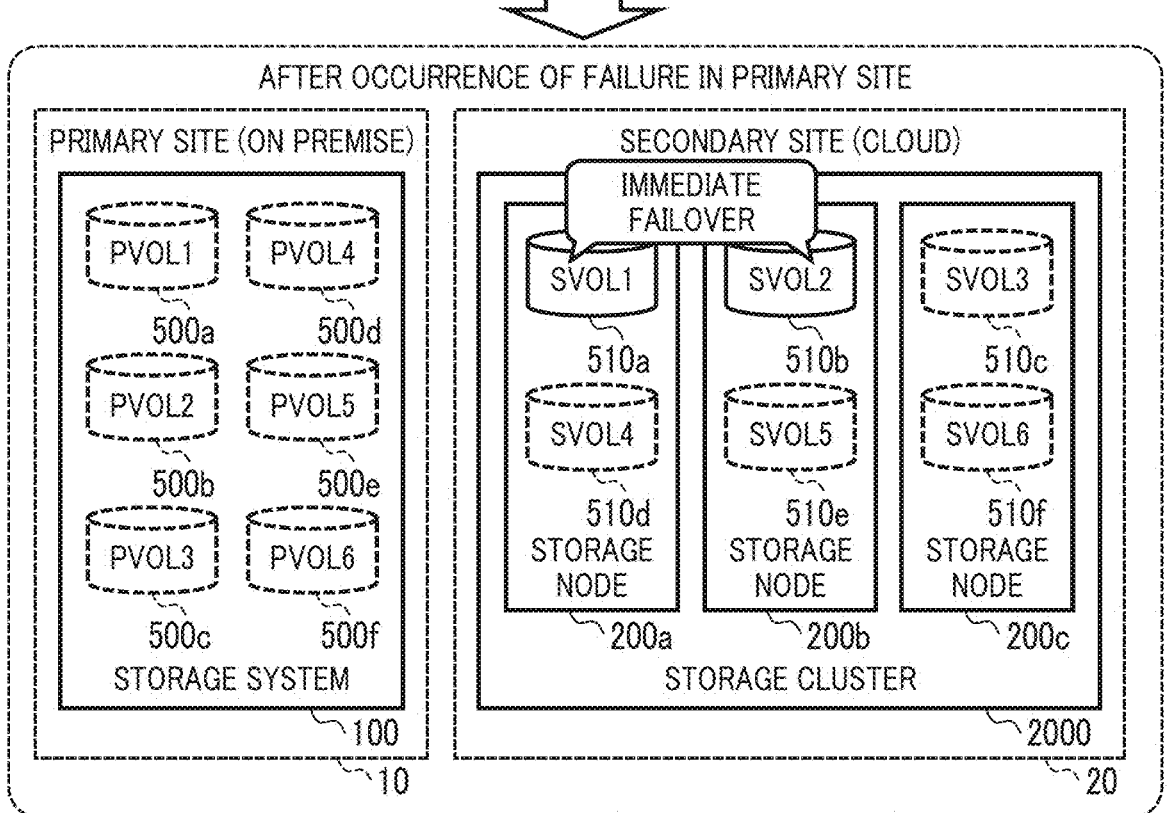

FIG. 9 is a diagram illustrating outline after occurrence of a failure in a primary site from a normal state of the storage management system 1 according to an embodiment.

The upper part of FIG. 9 illustrates the outline of the normal state of the storage management system 1. The lower part illustrates outline in which a failure occurs in the storage system 100 of the primary site 10 and a failover is performed to the storage cluster 2000 of the secondary site 20.

In the storage system 100 of the primary site 10 placed on a premise, a PVOL as a primary site VOL is defined. In the normal state, data can be input/output from/to the host computer 101. In the storage node 200 in the storage cluster 2000 of the secondary site 20 placed in the cloud, an SVOL as a secondary site VOL is defined. A remote copy pair of the SVOL is made with the PVOL. On updating of data on the PVOL accompanying I/O from/to the PVOL from the host computer 101 in the normal state, the data is transferred from the storage system 100 to the storage node 200 to update the data in the SVOL as the remote copy pair with the PVOL.

The PVOLs and SVOLs in FIG. 9 are illustrated so as to correspond to the example of entries in the recovery requirement management table 3310 of FIG. 5 and the example of entries in the remote copy pair management table of FIG. 8. For example, the VOL whose primary site VOL ID 3313 is 1 in the entry whose ID 3311 in the recovery requirement management table 3310 is 1 corresponds to a PVOL1 500a in the storage system 100. The VOL whose secondary site VOL ID 3314 is 1 corresponds to an SVOL1 510a in a storage node 200a. Also with respect to the recovery requirements 3315, the flow of processes is illustrated while making the outline descriptions of FIGS. 9 and 10 and the recovery requirement 3315 of each entry in the recovery requirement management table 3310 correspond to each other.

The specifications of the instance 210 in the storage cluster 2000 of the secondary site 20 in the normal state may be, for example, performance which can withstand data transfer by remote copying and performance in which an SVOL requiring an immediate failover to the storage cluster 2000 of the secondary site 20 after occurrence of a failure in the storage system 100 of the primary site 10 can withstand I/O operations from the host computer 201. Regarding determination of whether or not the instance specification is a performance in which an SVOL requiring an immediate failover can withstand the I/O operations from the host computer 201, for example, it is sufficient to collect the I/O amount from the host computer 101 to the storage system 100 in the normal state and time-sequential data of the I/O performance from the storage system 100, and estimate achievable I/O performance with reference to product specifications, a specification sheet or the like of the storage node 200. The estimation may be realized as a program on the disaster recovery management device 300.

After occurrence of a failure in the primary site 10, an SVOL requiring an immediate failover performs a failover immediately, and enables input/output of data from/to the host computer 201. An SVOL requiring an immediate failover may be determined, for example, in the case where information of the recovery requirement 3315 in the recovery requirement management table 3310 is "immediate failover is necessary", and in the case where an RTO value is set as the information of the recovery requirement 3315, and the time of the RTO is shorter than resource enhancement time of the storage cluster 2000.

Subsequently, outline after scale-out of a secondary site after occurrence of a failure in a primary site in the storage management system 1 will be described.

Figure 10:
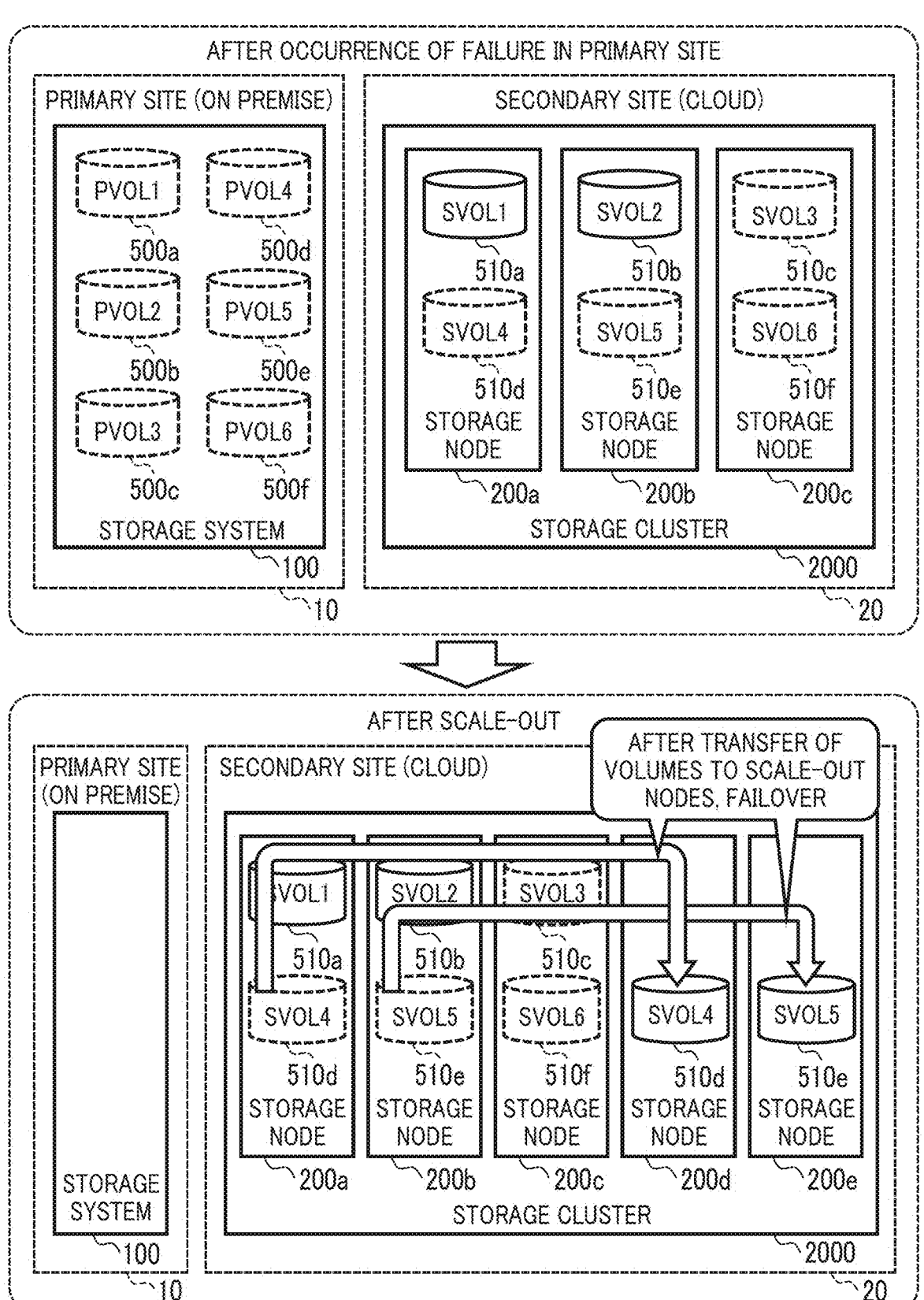
FIG. 10 is a diagram illustrating outline after scale-out of the secondary site after occurrence of a failure in the primary site of the storage management system according to an embodiment.

FIG. 10 is a diagram illustrating outlie after scale-out of a secondary site after occurrence of a failure in a primary site in the storage management system 1 according to an embodiment.

The upper part of FIG. 10 illustrates outline after a failure occurs in the storage system 100 of the primary site 10 and a failover is performed to the storage cluster 2000 of the secondary site 20. The lower part illustrates outline that the resources of the storage cluster 2000 are enhanced (in the example of the diagram, scale-out is performed by increasing the number of storage nodes 200) and, after that, SVOLs are transferred to the storage nodes 200 obtained by the resource enhancement to perform a failover.

The outline after occurrence of a failure in the primary site in the upper part of FIG. 10 is the state after the process in the lower part of FIG. 9. Since description of the outline of the process to reach this state overlaps the description of FIG. 9, it will not be repeated.

The PVOLs on the storage system 100 in the lower part of FIG. 10 are in the same definition state as that of the storage system 100 in the upper part of FIG. 10. They are not illustrated in the diagram.

After completion of all of failovers of SVOLs requiring an immediate failover, the program moves to the process in the lower part of FIG. 10. In the storage node 200 which has an SVOL which has not been subjected to a failover and is already configured, in the case where performance necessary to operate the SVOL is insufficient, the resources of the storage cluster 2000 are enhanced. The method of enhancing resources may be realized by scale-up of the instance specification of the storage node 200 to a higher specification, or scale-out of increasing the number of storage nodes 200 in the storage cluster 2000. FIG. 10 illustrates an example of realizing resource enhancement by scale-out by adding storage nodes 200d and 200e.

After the resource enhancement, the SVOLs are transferred to the resource-enhanced storage nodes 200. Any SVOL transfer method may be employed. For example, the internal function of the storage cluster 2000 may be used.

After transferring the SVOLs, the transferred SVOLs perform a failover so that I/O of data from/to the host computer 201 can be executed.

Until failovers of all of SVOLs are completed, the resource enhancement, SVOL transfer, and SVOL failover process are performed.

The resource enhancement, the SVOL transfer, and the SVOL failover may be processed in parallel unless there is no dependence relation between the SVOL and its placement destination storage node 200. For example, referring to the diagram of the lower part of FIG. 10, the failover process of an SVOL3 510c, transfer of an SVOL4 510d to the storage node 200d, and process of adding the storage node 200e may be performed in parallel.

The failover order of SVOLs may be determined on the basis of the recovery requirement. For example, a failover may be performed from the shortest RTO.

Transfer from which SVOL 510 to which storage node 200 may be determined by using an algorithm performing bin packing on the basis of, for example, information of surplus performance of the storage node 200 and the I/O performance necessary for the SVOL 510. The I/O performance necessary for the SVOL 510 may be based on I/O performance information from the host computer 101 for the PVOL 500 which is paired with the SVOL 510 as a remote copy pair in the normal time, or a Qos setting value designated from the user may be used.

Next, a recovery requirement managing process by the recovery requirement managing program 3210 will be described.

Figure 11:
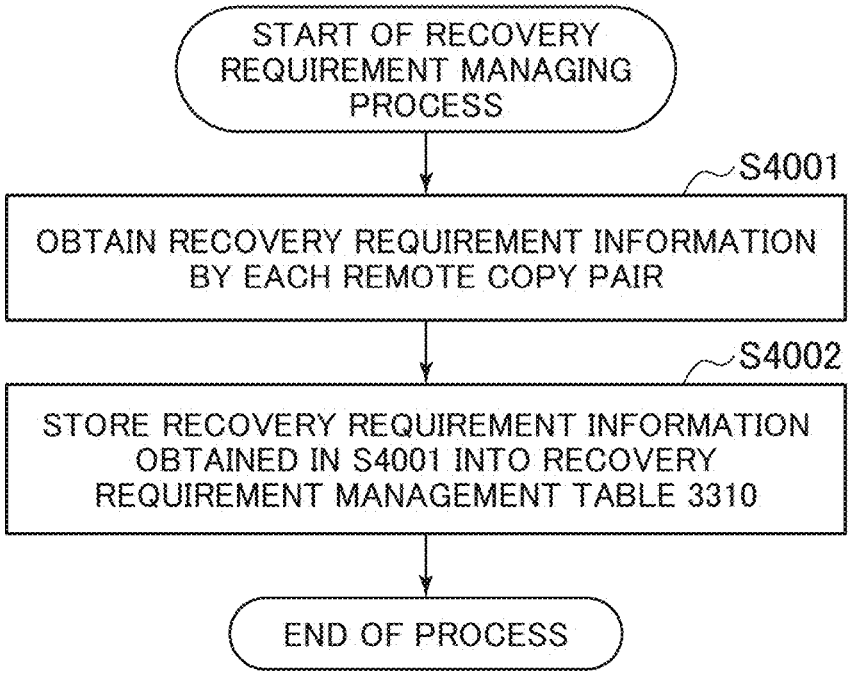
FIG. 11 is a flowchart of recovery requirement managing process according to an embodiment.

FIG. 11 is a flowchart of the recovery requirement managing process according to an embodiment.

Execution of the process of the recovery requirement managing program 3210 is started, for example, by an instruction from the user.

The recovery requirement managing program 3210 obtains recovery requirement information for each remote copy pair (step S4001). The recovery requirement information is information indicating until when recovery is done in the case where a failure occurs in the storage system 100 of the primary site 10 and a failover is carried out to the storage cluster 2000 of the secondary site 20. The recovery requirement information may be information of clear time designation such as RTO or information which does not indicate clear time such as immediate recovery or not.

As a method of obtaining recovery requirement information, for example, the information may be obtained from an input of the user or administrator, or may be obtained by collecting requirement information of an application program of the host computer using volumes of a remote copy pair managed by another program.

Subsequently, the recovery requirement managing program 3210 stores the recovery requirement information obtained in step S4001 into the recovery requirement management table 3310 (step S4002). As the recovery requirement 3315 at the time of being stored in the recovery requirement management table 3310, the information obtained in step S4001 may be stored as it is or the information which is processed, for example, by rounding an RTO value may be stored.

A performance information collecting process by the performance information collecting program 3220 will now be described.

Figure 12:
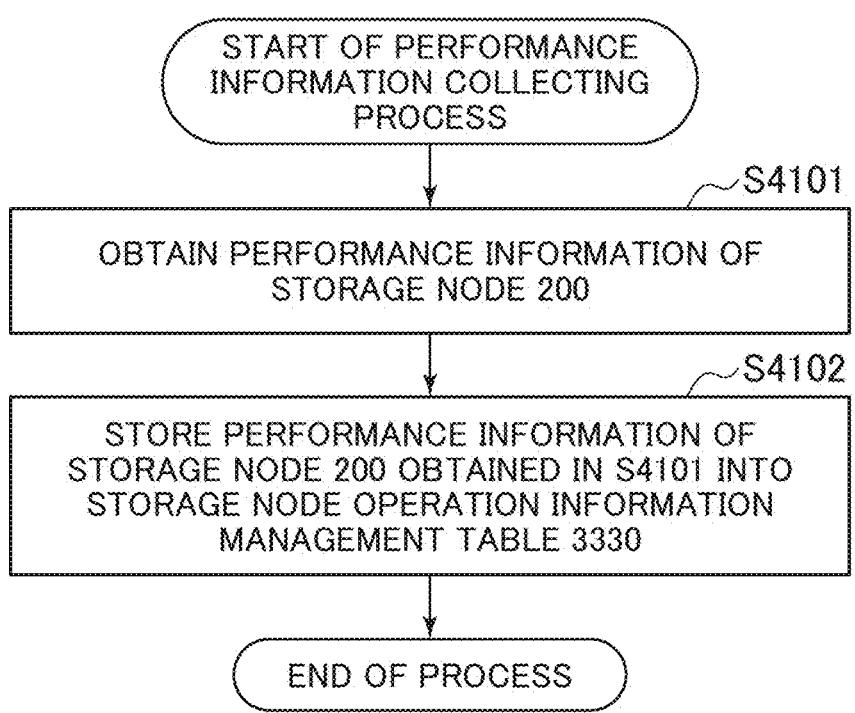
FIG. 12 is a flowchart of performance information collecting process according to an embodiment.

FIG. 12 is a flowchart of a performance information collecting process according to an embodiment.

The performance information collecting process is executed by the performance information collecting program 3220, for example, periodically.

The performance information collecting program 3220 obtains performance information of the storage node 200 (step S4101). As the performance information obtaining method, for example, a performance information obtaining request may be transmitted to each of the storage nodes 200 of the storage cluster 2000 and performance information may be transmitted from each of the storage nodes 200 in response to the request. It is also possible to transmit a performance information obtaining request to a representative storage node 200 in the storage cluster 2000, obtain performance information of each of the storage nodes 200 by the representative storage node 200, and transmit the collected information. It is also possible to transmit a performance information obtaining request to the management device 202 of the secondary site 20, obtain performance information of each of the storage nodes 200 by the management device 202, and transmit the collected information. The performance information may be obtained by a single communication or a plurality of times of communications.

Subsequently, the performance information collecting program 3220 stores the performance information obtained in step S4101 into the storage node operation information management table 3330 (step S4102).

As the performance information which is stored in the storage node operation information management table 3330, the information obtained in step S4101 may be stored as it is. For example, in the case of information which cannot be stored as it is since the obtained information is memory use amount, communication bandwidth use amount or the like and is not usage rate, the information is processed so as to be stored and the processed information may be stored in this step. As the instance specification ID 3337, at the time of configuring the storage cluster 2000, the instance specification of the storage node 200 may be stored in the storage node operation information management table 3330. Alternatively, the instance specification ID 3337 may be stored in a table which is separately prepared on a memory of the disaster recovery management device 300 or the management device 202, and the information may be obtained from the table and stored into the storage node operation information management table 3330.

A state monitoring process by the state monitoring program 3230 will now be described.

Figure 13:
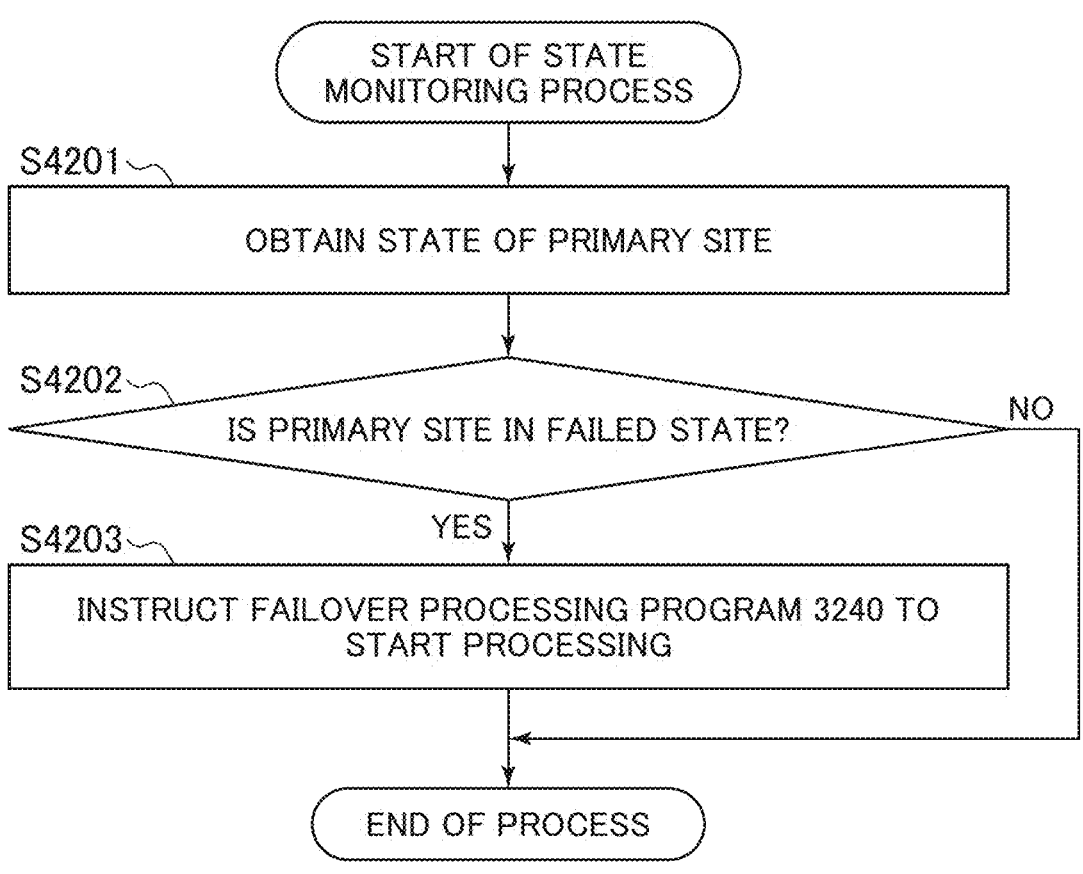
FIG. 13 is a flowchart of state monitoring process according to an embodiment.

FIG. 13 is a flowchart of a state monitoring process according to an embodiment.

The state monitoring process is executed by the state monitoring program 3230, for example, periodically. The execution cycle of the state monitoring process may be minimum time necessary for a requirement of disaster recovery. The process may be executed in cycles, for example, on the time scale of seconds.

The state monitoring program 3230 obtains the state of the primary site (step S4201). As the primary site state obtaining method, for example, a state acquisition request is transmitted to the storage system 100 of the primary site 10 and, in response to it, state information may be transmitted from the storage system 100. Alternatively, the storage system 100 may periodically transmit state information to the disaster recovery management device 300, or may transmit state information via the management device 102.

Subsequently, based on the state information obtained in step S4201, the state monitoring program 3230 determines whether the storage system 100 of the primary site 10 is in a failed state or not (S4202). When it is determined that the storage system 100 is in a failed state (step S4202: YES), the program advances to step S4203. When it is determined that the storage system 100 is not in a failed state (step S4202: NO), the state monitoring process is finished.

Subsequently, the state monitoring program 3230 instructs the failover processing program 3240 to start processing (step S4203).

A failover process by the failover processing program 3240 will now be described.

Figure 14:
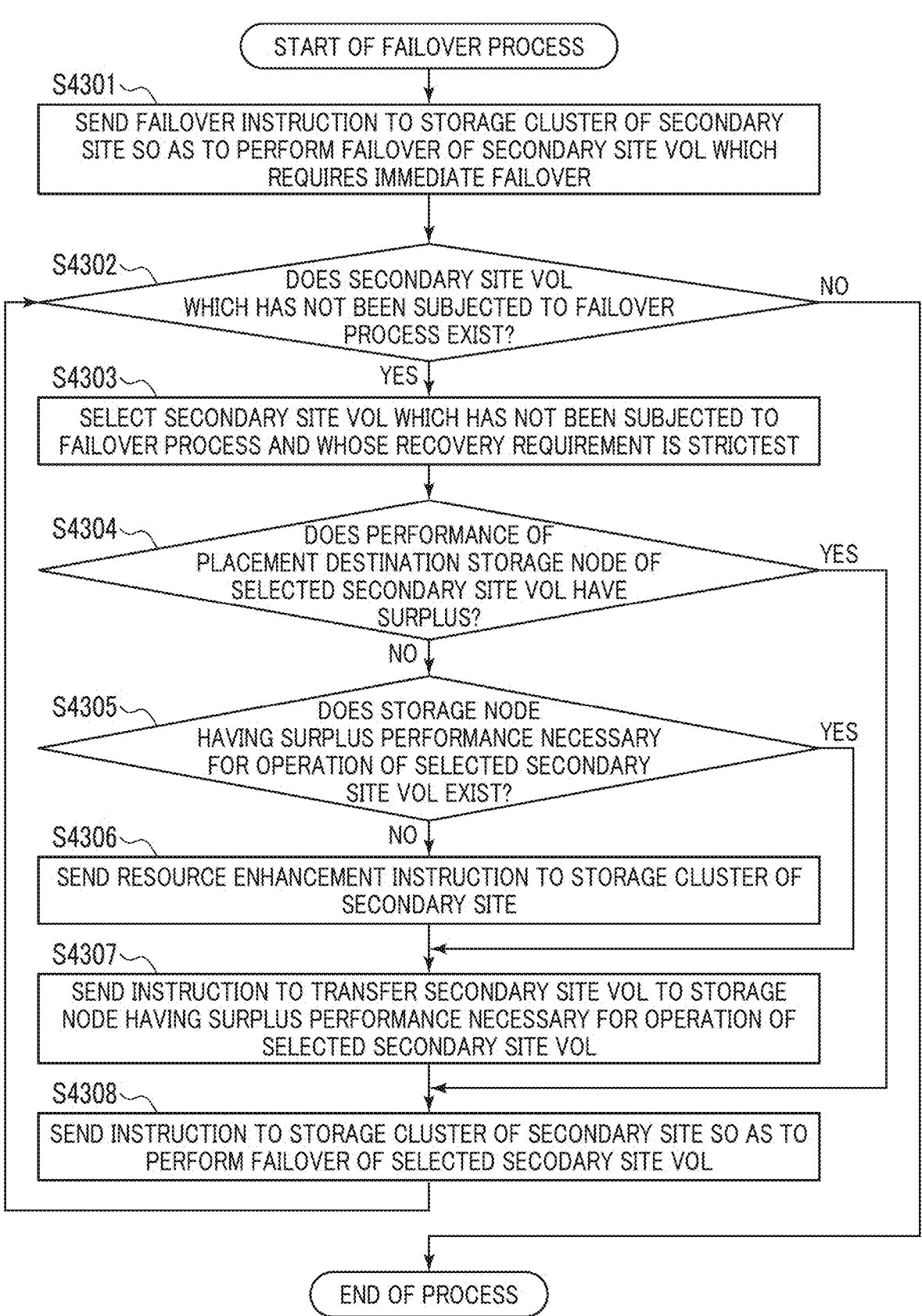
FIG. 14 is a flowchart of failover process according to an embodiment.

FIG. 14 is a flowchart of a failover process according to an embodiment.

The failover process is executed by the failover processing program 3240 which has received the instruction from the state monitoring program 3230.

The failover processing program 3240 sends a failover instruction to the storage cluster 2000 of the secondary site 20 so as to perform a failover of a secondary site VOL requiring an immediate failover (step S4301). Whether a secondary site VOL requires an immediate failover or not may be determined, for example, by referring to the recovery requirement 3315 in the recovery requirement management table 3310. After transmitting the failover instruction, completion of the failover process may be waited or may not be waited. In the case where completion of the failover process is not waited after the failover instruction, for example, it is sufficient to include a process of monitoring the failover process state. After the failover instruction, the recovery state 3345 in the remote copy pair management table 3340 is updated.

Subsequently, the failover processing program 3240 determines whether a secondary site VOL which has not been subjected to the failover process exists or not (step S4302). To determine whether a secondary site VOL which has not been subjected to the failover process exists or not, for example, it is sufficient to refer to the recovery state 3345 in the remote copy pair management table 3340. In the case where it is determined that a secondary site VOL which has not been subjected to the failover process does not exist (step S4302: NO), the process of the failover processing program 3240 is finished. In the case where it is determined that a secondary site VOL which has not been subjected to the failover process exists (step S4302: YES), the program advances to step S4303.

Subsequently, the failover processing program 3240 selects a secondary site VOL which has not been subjected to the failover process and whose recovery requirement in the recovery requirement management table is the strictest (step S4303). As the secondary site VOL whose recovery requirement is the strictest, for example, it is sufficient to select a secondary site VOL whose RTO value of the recovery requirement is the smallest. It is assumed that the secondary site VOL selected in step S4303 corresponds to the "selected secondary site VOL" in steps S4304 to S4308.

Subsequently, the failover processing program 3240 determines whether the performance of a storage node as a placement destination of the selected secondary site VOL has surplus or not (step S4304). In the case where it is determined that the performance of the storage node as the placement destination of the selected secondary site VOL has surplus (step S4304: YES), the program advances to step S4308. In the case where it is determined that there is no surplus (step S4304: NO), the program advances to step S4305. Whether there is surplus in the performance of the storage node as the placement destination of the selected secondary site VOL may be determined, for example, on the basis of information of surplus performance of the storage node 200 and I/O performance necessary for the selected secondary site VOL. In the case where the surplus performance necessary to realize I/O performance necessary for the selected secondary site VOL exists in the storage node 200, it is determined that there is surplus. As surplus performance of the storage node 200, information of the storage node operation information management table 3330 may be used. As I/O performance information necessary for a secondary site VOL, I/O performance information of a primary site VOL which is paired with the secondary site VOL as a remote copy pair in the normal state, or the value of Qos which is set for the secondary site VOL may be used.

Subsequently, the failover processing program 3240 determines whether a storage node 200 having surplus performance necessary for the operation of the selected secondary site VOL exists or not (step S4305). In the case where it is determined that a storage node 200 having surplus performance necessary for the operation of the selected secondary site VOL exists (step S4305: YES), the program advances to step S4307. In the case of determination that it does not exists (step S4305: NO), the program advances to step S4306. Whether there is a storage node 200 having surplus performance necessary for the operation of the selected secondary site VOL may be determined, for example, on the basis of information of surplus performance of the storage node 200 and I/O performance necessary for the selected secondary site VOL. In the case where a storage node having the surplus performance necessary to realize I/O performance necessary for the selected secondary site VOL exists, the existence may be determined. As surplus performance of the storage node 200, information of the storage node operation information management table 3330 may be used. As I/O performance information necessary for a secondary site VOL, I/O performance information of a primary site VOL which is paired with the secondary site VOL as a remote copy pair in the normal state, or the value of Qos which is set for the secondary site VOL may be used.

Subsequently, the failover processing program 3240 sends a resource enhancement instruction to the storage cluster 2000 of the secondary site 20 (step S4306). The method of enhancing resources may be realized by scale-up of the instance specification of the storage node 200 to a higher specification, or scale-out of increasing the number of storage nodes 200 in the storage cluster 2000. In the case of the storage cluster 2000 to which both scale-out and scale-up can be performed, for determination of selecting which one of the resource enhancing methods, information of requirement time of scale-out and that of scale-up may be used. Information of the performance influence on the secondary site VOL which has been subjected to the failover and is operating by the process of each of scale-out and scale-up may be used. The determination may be comprehensively made in consideration of combination of those information. For selection of an instance specification of the storage node 200 at the time of resource enhancement, it is sufficient to use the information of the instance specification management table 3320. In the case of selecting an instance specification when a plurality of selectable instance specifications exist, the information of I/O performance necessary for a secondary site VOL which has not been completed a failover and I/O performance which can be provided by the storage node 200 corresponding to each instance specification may be prepared and used for the determination.

At the time of scale-out, initial setting of a node and transfer of a volume are necessary. Consequently, requirement time of scale-out is generally longer than that of scale-up.

On the other hand, scale-up cannot be executed in a node including a volume which is being in a failover process.

Therefore, by enhancing resources by scale-up when a node including a volume to be subjected to a failover after resource enhancement does not include a volume of an immediate failover, and by enhancing resources by scale-out when a node including a volume to be subjected to a failover after resource enhancement includes another volume of an immediate failover, time required to complete all of the failover can be shortened.

After sending the instruction of resource enhancement to the storage cluster 2000 of the secondary site 20, completion of the resource enhancement process may be waited or may not be waited. In the case where completion of the resource enhancing process is not waited, for example, it is sufficient to add a secondary site VOL whose recovery state is "resources being enhanced" as an option in the determination of a secondary site VOL in steps S4302 and S4303. As the priority, it is sufficient to select a secondary site VOL of "recourses being enhanced" next to a secondary site VOL which has not been subjected to failover process.

Subsequently, the failover processing program 3240 sends an instruction to transfer the secondary site VOL to the storage node 200 having the surplus performance necessary for the operation of the selected secondary site VOL (step S4307). The process completion of the transfer of the secondary site VOL may be waited or may not be waited. In the case where completion of the transfer process of the secondary site VOL is not waited, for example, it is sufficient to add a secondary site VOL whose recovery state is "being transferred to another storage node" as an option in the determination of a secondary site VOL in steps S4302 and S4303. As the priority, it is sufficient to select a secondary site VOL of "being transferred to another storage node" next to a secondary site VOL which has not been subjected to failover process.

Subsequently, the failover processing program 3240 sends an instruction to the storage cluster 2000 of the secondary site 20 so as to perform a failover of the selected secondary site VOL (step S4308). After transmitting the failover instruction, completion of the failover process may be waited or may not be waited. In the case where the completion of the failover process is not waited after the failover instruction, for example, it is sufficient to include a process of monitoring the failover process state and updating the recovery state 3345 of the remote copy pair management table 3340.

Finally, when a state where a secondary site VOL which has not been subjected to the failover process does not exist is obtained in step S4302, the process of the failover processing program 3240 is finished.

In the embodiment, as the process performed when the primary site 10 recovers from a failure and a failback is performed from the secondary site 20, any method may be employed. For example, it is possible to manage information of the difference between a PVOL immediately after occurrence of a failure due to data updating by an I/O from the host computer 201 and an SVOL in the storage node 200 of the secondary site 20 which performs a failover during the failure in the primary site 10, transmit the difference information at the time of a failback to the storage system 100 to the storage system 100, and perform the failback so that the data of the PVOL and the data of the SVOL are synchronized.

As described above, the disclosed computer system is a computer system (storage management system 1) including: a primary site storage system (100) in which a primary site providing a plurality of primary volumes to a host (host computer 101) is configured; a secondary site storage system (2000) which is connected to the primary site storage system via a network (400) and in which a secondary site providing a plurality of secondary volumes in which remote copies of the plurality of primary volumes are set is configured; and a management device (disaster recovery management device 300) managing the primary site storage system and the secondary site storage system. The management device can change a resource of the secondary site storage system. In the case where a failure occurs in the primary site, the management device performs a failover of making a corresponding secondary volume take over operation of the primary volume, controls so as to enhance a resource of the secondary site storage system, and controls the failover so that a secondary volume which starts operating by the failover before the enhancement of the resource and a secondary volume which starts operating by the failover after the enhancement of the resource exist.

With the configuration and the operation, while suppressing cost and consumption power as compared with the case of preparing excessive resources in hardware of the secondary site in normal times, violation of the recovery requirement can be prevented at the time of a failover to the secondary site in the event of failure occurrence.

The management device holds recovery requirement information indicating a requirement of recovery with respect to the plurality of secondary volumes, and determines the timing of performing a failover and operation start, which is either before or after enhancement of the resource, for each of the secondary volumes on the basis of a surplus resource of the secondary site storage system and the recovery requirement information.

Consequently, a primary volume which places priority on a failover over resource enhancement can be always directly designated.

Moreover, recovery time objective is designated for the secondary volume as the recovery requirement information, and the management device determines the timing of performing a failover, which is either before or after enhancement of the recourse on the basis of the surplus resource, the recovery time objective, and time required to enhance the resource.

Consequently, while certainly avoiding RTO violation, resource enhancement can be executed promptly.

The secondary site storage system has a plurality of nodes, the enhancement of the resource includes scale-up which improves performance of the node and scale-out which increases the number of nodes. The management device determines which one of the scale-up and the scale-out is performed at the time of the resource enhancement.

Therefore, the resource can be enhanced by a method according to the situation.

In the case where one node has a secondary volume which starts operating by a failover before enhancement of the resource and a secondary volume which starts operating by a failover after enhancement of the resource, the computer system performs the scale-out, transfers the secondary volume which starts operating by a failover after the enhancement of the resource to a node which is added by the scale-out, and makes the secondary volume operate.

Consequently, also in the case where both a volume which is subjected to a failover before resource enhancement and a volume which is subjected to a failover after resource enhancement exist, required time until all of failovers are finished can be shortened.

In the case where one node does not have a secondary volume which starts operating by a failover before enhancement of the resource and has a secondary volume which starts operating by a failover after enhancement of the resource, the scale-up is performed, and then the secondary volume which starts operating by a failover after enhancement of the resource is made to operate.

Consequently, when scale-up whose required time is shorter than that of scale-out can be performed, by placing priority on the scale-up, required time until all of failovers are finished can be shortened.

Before occurrence of the failure, the management device controls so that a node in which a secondary volume which starts operating by a failover before enhancement of the resource is placed has a surplus resource sufficient to make the secondary volume operate by a failover.

Consequently, while avoiding a situation that input/output performance decreases at the event of occurrence of a failover, the cost and consumption power can be lowered.

The present invention is not limited to the above-described embodiments, and further includes various modifications. For example, the above-described embodiments have been described in detail in order to facilitate the understanding of the present invention, and the present invention is not necessarily limited to those including all of the described configurations. Not only deletion of the configurations, but also replacement and addition of the configuration is possible.

What is claimed is:

1. A computer system comprising:
a primary site storage system in which a primary site providing a plurality of primary volumes to a host is configured;
a secondary site storage system which is connected to the primary site storage system via a network and in which a secondary site providing a plurality of secondary volumes in which remote copies of the plurality of primary volumes are set is configured; and
a management device managing the primary site storage system and the secondary site storage system, wherein
the management device is configured to change a resource of the secondary site storage system,
in a case where a failure occurs in the primary site, the management device performs a failover of making a corresponding secondary volume take over operation of the primary volumes, controls so as to enhance a resource of the secondary site storage system, and controls the failover so that a secondary volume which starts operating by the failover before the enhancement of the resource and a secondary volume which starts operating by the failover after the enhancement of the resource exist, and
the management device:
holds recovery requirement information indicating a requirement of recovery with respect to the plurality of secondary volumes; and
determines a timing of performing a failover and starting operation, which is either before or after enhancement of the resource, for each of the secondary volumes on a basis of a surplus resource of the secondary site storage system and the recovery requirement information.

2. The computer system according to claim 1, wherein recovery time objective is designated for the secondary volume as the recovery requirement information, and the management device determines the timing of performing a failover, which is either before or after enhancement of a recourse on the basis of the surplus resource, the recovery time objective, and time required to enhance the resource.

3. The computer system according to claim 1, wherein, before a failure occurrence, the management device controls so that a node in which a secondary volume which starts operating by a failover before enhancement of the resource is placed has a surplus resource sufficient to make the secondary volume operate by a failover.

4. A computer system comprising:
a primary site storage system in which a primary site providing a plurality of primary volumes to a host is configured;
a secondary site storage system which is connected to the primary site storage system via a network and in which a secondary site providing a plurality of secondary volumes in which remote copies of the plurality of primary volumes are set is configured; and
a management device managing the primary site storage system and the secondary site storage system,
wherein the management device is configured to change a resource of the secondary site storage system,
wherein, in a case where a failure occurs in the primary site, the management device performs a failover of making a corresponding secondary volume take over operation of the primary volumes, controls so as to enhance a resource of the secondary site storage system, and controls the failover so that a secondary volume which starts operating by the failover before the enhancement of the resource and a secondary volume which starts operating by the failover after the enhancement of the resource exist,
wherein the secondary site storage system has a plurality of nodes,
wherein the enhancement of the resource includes scale-up which improves performance of the node and scale-out which increases a number of nodes, and
wherein the management device determines which one of the scale-up and the scale-out is performed at the time of the resource enhancement.

5. The computer system according to claim 4, wherein, in a case where one node has a secondary volume which starts operating by a failover before enhancement of the resource and a secondary volume which starts operating by a failover after enhancement of the resource, the scale-out is performed and the secondary volume which starts operating by a failover after the enhancement of the resource is transferred to a node which is added by the scale-out and is made to operate.

6. The computer system according to claim 5, wherein in the case where one node does not have a secondary volume which starts operating by a failover before enhancement of the resource and has a secondary volume which starts operating by a failover after enhancement of the resource, the scale-up is performed, and then the secondary volume which starts operating by a failover after enhancement of the resource is made to operate.

7. A storage managing method performed by a computer system comprising: a primary site storage system in which a primary site providing a plurality of primary volumes to a host is configured; a secondary site storage system which is connected to the primary site storage system via a network and in which a secondary site providing a plurality of secondary volumes in which remote copies of the plurality of primary volumes are set is configured; and a management device managing the primary site storage system and the secondary site storage system, wherein
the management device is configured to change a resource of the secondary site storage system, in a case where a failure occurs in the primary site, the management device performs a failover to make a corresponding secondary volume take over operation of the primary volume, controls so as to enhance a resource of the secondary site storage system, and controls the failover so that a secondary volume which starts operating by the failover before the enhancement of the resource and a secondary volume which starts operating by the failover after the enhancement of the resource exist, and the management device:

holds recovery requirement information indicating a requirement of recovery with respect to the plurality of secondary volumes; and determines a timing of performing a failover and starting operation, which is either before or after enhancement of the resource, for each of the secondary volumes on a basis of a surplus resource of the secondary site storage system and the recovery requirement information.

\* \* \* \* \*